United States Patent [19]

Shiokawa

[11] Patent Number: 5,522,662

[45] Date of Patent: Jun. 4, 1996

[54] CLINICAL THERMOMETER

[75] Inventor: Masahiro Shiokawa, Fujinomiya, Japan

[73] Assignee: Terumo Kabushiki Kaisha, Tokyo, Japan

[21] Appl. No.: 220,700

[22] Filed: Mar. 31, 1994

[30] Foreign Application Priority Data

Apr. 1, 1993 [JP] Japan .................................. 5-075544

[51] Int. Cl.⁶ .................................. G01J 5/08; A61B 5/00
[52] U.S. Cl. .................................. 374/130; 374/131; 128/664; 128/736
[58] Field of Search .................................. 374/130, 131; 128/664, 736

[56] References Cited

U.S. PATENT DOCUMENTS

| | | | |
|---|---|---|---|
| 4,497,585 | 2/1985 | Paull et al. | 128/736 |
| 4,895,164 | 1/1990 | Wood | 128/736 |
| 5,012,813 | 5/1991 | Pompei et al. | 374/130 |
| 5,017,018 | 5/1991 | Iuchi et al. | 374/130 |
| 5,024,533 | 6/1991 | Egawa et al. | 128/736 |
| 5,167,235 | 12/1992 | Seacord et al. | 374/131 |
| 5,325,863 | 7/1994 | Pompei | 128/736 |
| 5,368,038 | 11/1994 | Fraden | 374/131 |
| 5,381,796 | 1/1995 | Pompei | 374/131 |

FOREIGN PATENT DOCUMENTS

| | | | |
|---|---|---|---|
| 0044791 | 1/1982 | European Pat. Off. | |
| 0120028 | 6/1986 | Japan | 128/736 |
| 404109928 | 4/1992 | Japan | 128/736 |
| 404193256 | 7/1992 | Japan | 128/736 |
| 406000165 | 1/1994 | Japan | 128/736 |
| 406142061 | 5/1994 | Japan | 128/736 |
| 86/06163 | 10/1986 | WIPO | |
| 90/05902 | 5/1990 | WIPO | |
| 90/06090 | 6/1990 | WIPO | |
| 092010133 | 6/1992 | WIPO | 128/736 |

OTHER PUBLICATIONS

Patent Abstracts of Japan, JP 2263125, Published 25 Oct. 1990, vol. 15, No. 19 (P–1153) (Only Abstract Considered).
Patent Abstracts of Japan, JP 2028524, Published 30 Jan. 1990, vol. 14, No. 179 (P–1034) (Only Abstract Considered).
Patent Abstracts of Japan, JP 414138, Published 14 May 1992, vol. 16, No. 413 (C–0980) (only Abstract Considered).

*Primary Examiner*—Diego F. F. Gutierrez
*Attorney, Agent, or Firm*—Burns, Doane, Swecker & Mathis

[57] ABSTRACT

A clinical thermometer for measuring the temperature of a living body in a noncontacting manner by receiving infrared radiation from an eardrum or a body surface. An infrared sensor senses infrared radiation incident through an opening portion for narrowing the angle of the field of view of the infrared sensor. An electrical signal from the infrared sensor is converted into the value of the temperature of an object to be measured. A maximum value $TP_{ob}$ of the converted temperature values is detected. In this manner, the maximum value $TP_{ob}$ detected when a predetermined time has elapsed from the start of the measurement is determined as the temperature of the object to be measured. The predetermined time at which the measurement is ended is extended in accordance with the time elapsed when the maximum value $TP_{ob}$ is detected, thereby determining the temperature of the object to be measured.

17 Claims, 13 Drawing Sheets

CLINICAL THERMOMETER

BACKGROUND OF THE INVENTION

1. Field of the Invention

The present invention relates to a noncontacting clinical thermometer for measuring the temperature of an eardrum or a body surface as an object of temperature measurement.

2. Description of the Related Art

Conventionally, contacting clinical thermometers for measuring the skin temperature of a living body have been extensively used for general purposes. The temperature of a body surface to be measured by such a clinical thermometer is strongly influenced by an environmental temperature. Therefore, the body surface temperature is different in nature from a so-called body temperature which is used in fields of medical treatments and medical science for the purposes of screening for the presence/absence and the condition of a disease, and for the basal body temperatures of women. For this reason, it is inadequate to measure and use the skin temperature as a body temperature for these purposes.

Consequently, thermometry for an eardrum has begun to be performed by using a noncontacting temperature sensor. The clinical meaning of an eardrum temperature will be mentioned. A body temperature means a core temperature at which homeostasis is held in a living body, and a hypothalamus is considered to be the center for regulating this core temperature. From an anatomical viewpoint, an internal carotid artery perfused in the hypothalamus as the thermoregulatory center runs near an eardrum, which means that the eardrum and the hypothalamus share blood. It is therefore assumed that the correlation between the eardrum and the hypothalamus with respect to a temperature change is extremely high.

For this reason, the eardrum temperature has long attracted attention as a site reflecting the temperature of the hypothalamus as the thermoregulatory center of a living body. However, any conventional contacting clinical thermometer cannot measure the eardrum temperature, since thermometry using a contacting sensor may damage the eardrum. A radiation clinical thermometer using an infrared sensor has been proposed to eliminate this danger of eardrum damages and to make body temperature measurement within a short time period possible.

As shown in FIG. 13, however, a conventional noncontacting eardrum clinical thermometer making use of radiation has a wide field of view ($V_1$) of an infrared sensor and an optical system associated with the sensor. Therefore, this clinical thermometer captures not only an eardrum $V_2$ but also an external auditory meatus within the field of view of the infrared sensor. Note that the wide angle of field of the optical system means that an incident angle corresponding to an infrared incident sensitivity of 50% is larger than 0.586 $\pi$sr (steradian), as a solid angle, with respect to the infrared incident sensitivity in the optical axis direction of the optical system. In this case, the optical axis of the optical system is generally in agreement with the normal direction of the light-receiving surface of the infrared sensor, and sr (steradian) is the unit of a solid angle. An angle (rad) on a plane is calculated as $L/r$ by dividing the length $L$ of a circular arc by its radius $r$. Likewise, the sr is calculated as $A/R^2$ by dividing the area $A$ on the surface of a sphere by the square of its radius $R$. 0.586 $\pi$sr corresponds to $\pi/4$ rad as an angle from the optical axis, i.e., as a zenith angle viewed from the light-receiving surface of the infrared sensor.

As described above, the conventional noncontacting eardrum clinical thermometer using radiation has a wide angle of field of the infrared sensor, so the infrared sensor receives radiation energy as an average temperature of an eardrum temperature and an external auditory meatus temperature. This makes it impossible to measure a true eardrum temperature. In addition, even if it is possible to narrow the field of view of the infrared sensor and the optical system associated with the sensor, an eardrum exhibiting the highest temperature in an external ear is difficult to reliably capture in the field of view of the infrared sensor within a limited thermometric time. Consequently, it is difficult to reliably measure a true eardrum temperature.

An anatomical comparison of an external ear and an eardrum shows that venous blood heated or cooled in a head or the like is present in many sinus venosuses around an external auditory meatus. For this reason, the temperature of an external auditory meatus is readily influenced by an environmental temperature and therefore is not necessarily in agreement with the temperature of a hypothalamus as the thermoregulatory center. Therefore, the eardrum temperature including this external auditory meatus temperature cannot be said to be the core temperature of a living body in a true sense.

That is, the conventional noncontacting eardrum clinical thermometer using radiation has a wide field of view of the infrared sensor and the optical system associated with the sensor. Consequently, the conventional clinical thermometer senses the temperature including the external auditory meatus temperature susceptible to the influence of an environmental temperature, so this temperature is inadequate to be used as an indication of the eardrum temperature. In addition, the use of this temperature as a body temperature is also dangerous from a clinical viewpoint because the condition of a disease may be misread.

SUMMARY OF THE INVENTION

The present invention has been made in consideration of the above situation, and has as its object to provide a substantially noncontacting clinical thermometer capable of measuring a body temperature by accurately measuring an eardrum temperature.

It is another object of the present invention to provide a clinical thermometer capable of rapidly measuring an accurate body temperature.

It is still another object of the present invention to provide a clinical thermometer by which it is possible to confirm whether infrared light from an eardrum is accurately sensed.

It is still another object of the present invention to provide a clinical thermometer capable of preventing incidence of infrared light from portions other than a portion of interest by narrowing a field of view for receiving infrared radiation.

It is still another object of the present invention to provide a clinical thermometer capable of measuring a body temperature more accurately by changing the measurement conditions, using at least one of the following, the time elapsed from starting the measurement of a body temperature to detecting the maximum temperature value, the temperature values and a change of the temperature values measured in the time.

It is still another object of the present invention to provide a clinical thermometer capable of preventing incidence of infrared light from a portion, such as an external ear, other than an eardrum, during body temperature measurement.

It is still another object of the present invention to provide a clinical thermometer by which a user can readily confirm the end of body temperature measurement for an eardrum temperature.

To accomplish the objects described above, the present invention relates to a clinical thermometer for measuring a temperature of a living body in a noncontacting manner by receiving infrared radiation from an eardrum or a body surface, comprising: an narrowing means for narrowing an angle of field of an infrared sensor for sensing infrared radiation; converting means for converting an electrical signal from said infrared sensor into a value of a temperature of an object to be measured; detecting means for detecting a maximum value of the temperature values converted by said converting means; and temperature determining means for determining the temperature of the object to be measured, based on the maximum value is detected by said detecting means, when a predetermined time has elapsed from the start of the measurement.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be described in detail below with reference to the accompanying drawings.

<1ST EMBODIMENT>

Figure 1:
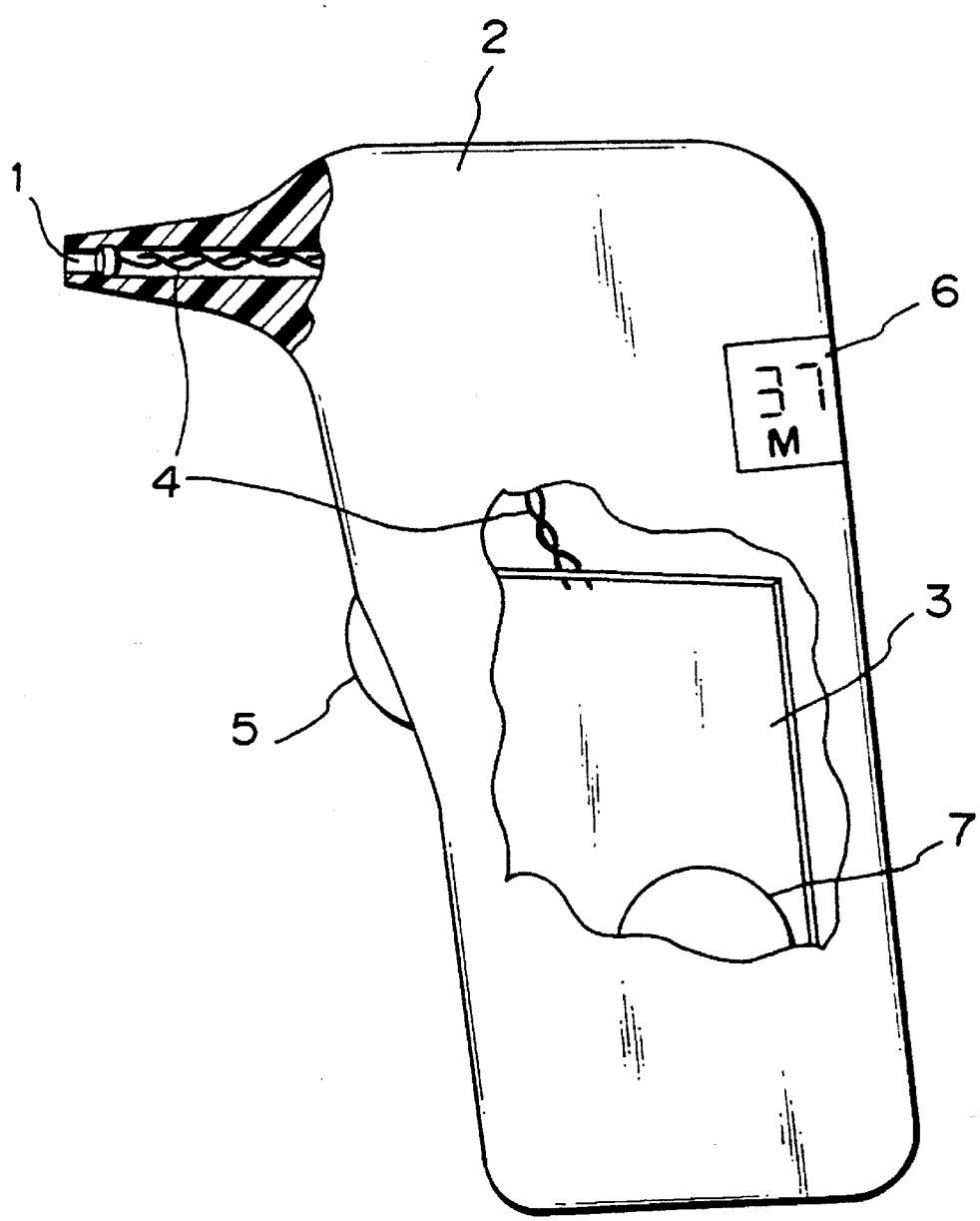
FIG. 1 is a (partial sectional) view showing the outer appearance of a noncontacting clinical thermometer according to the first embodiment of the present invention.

FIG. 1 is a (partially cutaway and partially sectional) schematic view showing an integrated eardrum clinical thermometer according to the first embodiment of the present invention.

Figure 2:
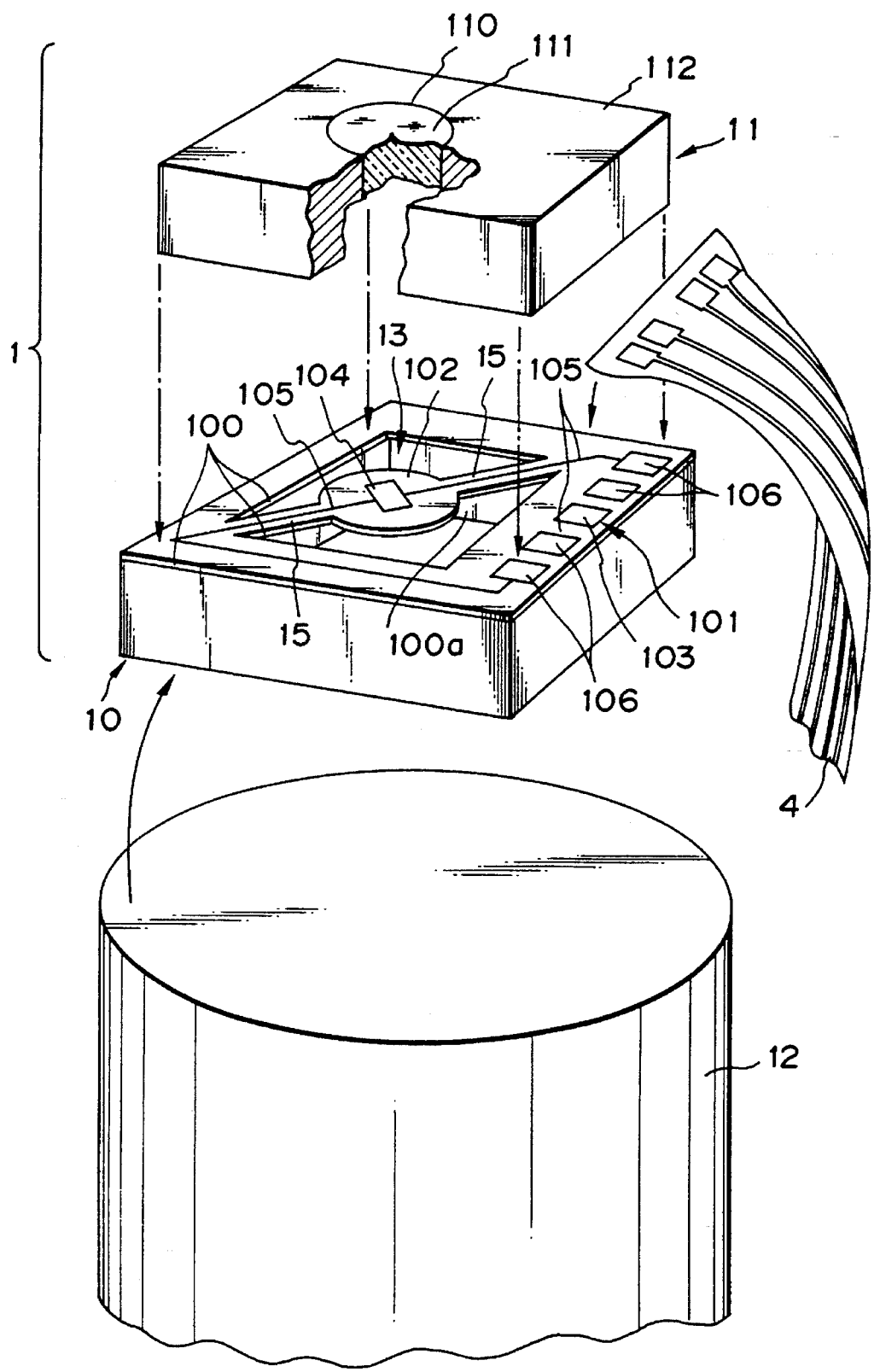
FIG. 2 is a perspective view showing the structure of an infrared sensor of the clinical thermometer of the first embodiment.

Referring to FIG. 1, reference numeral 1 denotes an infrared sensor such as a thermopile or a bolometer; 2, a housing of the clinical thermometer of this embodiment; 3, a signal processing circuit; 4, a signal line for electrically connecting the sensor 1 and the signal processing circuit 3; 5, a switch (to be described later); 6, a temperature display unit (LCD); and 7, a buzzer. As shown in FIG. 2, the thermal infrared sensor 1 has a sensor chip 10 fabricated by dicing a silicon (Si) wafer, a window member 11, and a support member 12. If the sensor 1 is a bolometer, the sensor takes the structure as shown in FIG. 2.

Referring to FIG. 2, the sensor chip 10 has a thin film 100 consisting of silicon oxynitride. This thin film 100 is an electrical insulator and has a thickness of a few micrometers, e.g., about 3 μm. The thin film 100 has a heat sink unit 101 having a lower surface on which single-crystal Si is present, and a light-receiving unit 102 having a lower surface on which no single-crystal silicon (Si) is present. The heat capacity of this light-receiving unit 102 is extraordinarily lower than that of the heat sink unit 101. Therefore, the temperature of the light-receiving unit 102 is raised by a slight heat flow resulting from infrared radiation.

Temperature-sensitive elements 103 and 104 are mounted on the heat sink unit 101 and the light-receiving unit 102, respectively. The temperature-sensitive elements 103 and 104 are thermistors, e.g., amorphous silicon (a-Si) thin (about 0.01–0.1 μm) films formed by sputtering. The temperature-sensitive elements 103 and 104 are brought into ohmic contact with leads 105, on which a metal such as aluminum (Al) is vapor-deposited, through silicide (not shown) and are thereby electrically connected to electrode pads 106. These temperature-sensitive elements 103 and 104 can naturally be electrical elements, such as p-n junctions, having a temperature dependency.

The window member 11 consists essentially of a substance, such as Si, having a high infrared transmittance and a high rigidity, and includes a narrowing member 110 such as an aperture or an opening portion to optically converge infrared radiation. The narrowing member 110 is formed by partially vapor-depositing a material, such as Au, which has a high reflectance on the window member 11. That is, the window member 11 is separated into an infrared window 111 for passing infrared radiation formed by the narrowing member 110, and an infrared shielding area 112 for substantially shielding infrared radiation. By this narrowing member 110, only infrared radiation from the surface of a certain target point or area of an object to be measured is incident on the light-receiving unit 102 of the sensor chip 10. This narrowing member 110 does not necessarily have an opening portion.

The narrower the angle of the field of view of the sensor 1 which is defined by the narrowing member 110 is, the object to be measured becomes easier to sense as a spot. If the angle of the field of view is too narrow, however, the gain of the sensor 1 decreases, and this is undesirable with respect to S/N ratio. For this reason, it is desirable that the angle of the field of view be about 0.068 to 0.586 πsr as a solid angle.

The sensor chip 10 is fixed by the support member 12 composed of a metal, such as copper, copper alloy, silver and silver alloy, having a high thermal conductivity. The electrode pads 106 of the sensor chip 10 are electrically connected to one end of the signal line 4 constituted by, e.g., a flexible printed circuit board (FPC) through soldering or the like and are thereby connected to the signal processing circuit 3.

Figure 3:
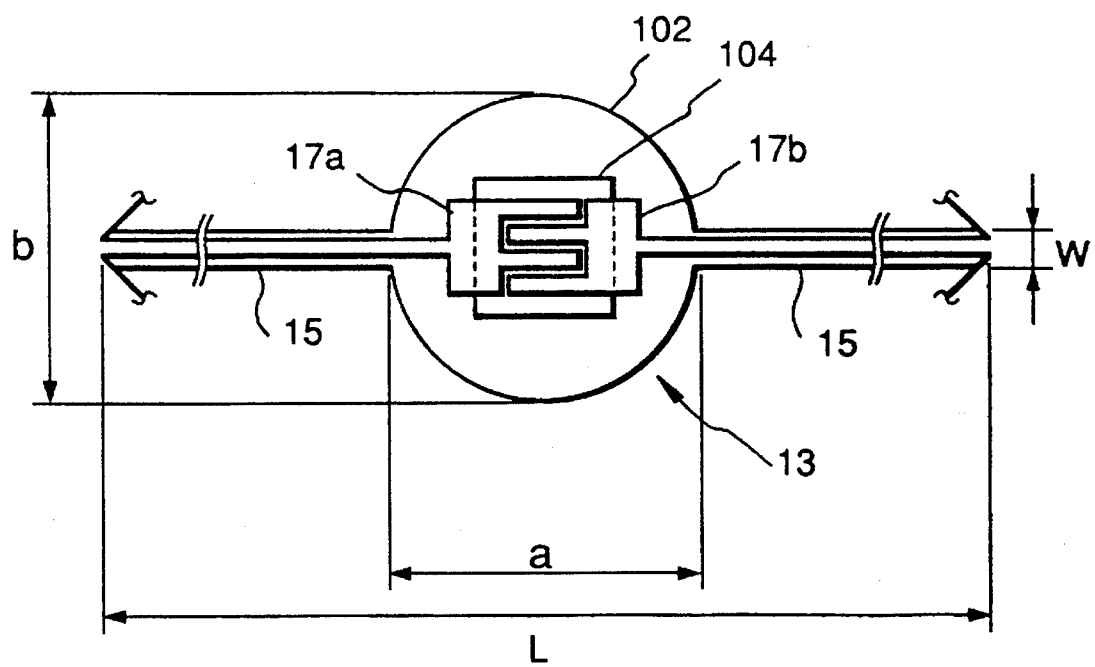
FIG. 3 is a plan view showing the arrangement of a sensor chip of the first embodiment.

FIG. 3 is a plan view showing the sensor chip 10 of the infrared sensor 1 according to this embodiment.

In this sensor chip 10, a hollow portion 100a (FIG. 2) is formed in a silicon substrate (thickness=about 300 to 400 µm) as a sensor substrate, and a bridge 13 is formed on the upper surface side of this hollow portion. The bridge 13 is constituted by the infrared light-receiving unit 102 whose planar shape is, e.g., substantially a circle, and two support units 15 for supporting this infrared light-receiving unit 102. The infrared light-receiving unit 102 and the support units 15 are integrally formed by a silicon oxynitride film with a substantially uniform predetermined thickness of, e.g., about 3 µm. The temperature-sensitive element 104 is made from a substance having a thermistor effect by which an electrical resistance changes in accordance with a temperature change. Examples of the substance are amorphous silicon (a-Si) and amorphous germanium (a-Ge). The temperature-sensitive element 104 is connected to interdigital interconnection layers 17a and 17b consisting essentially of a metal such as aluminum and is connected to the signal processing circuit 3 through the interconnection layers 17a and 17b.

In the infrared sensor of this embodiment, infrared radiation emitted from an object such as the eardrum area of a living body and a surface of a living body whose temperature is to be measured is incident through the infrared window 111 of the window member 11 and received by the infrared light-receiving unit 102. The infrared radiation (temperature) received by the infrared light-receiving unit 102 is transmitted to the temperature-sensitive element 104, changing the electrical resistance of the temperature-sensitive element 104. This electrical resistance is detected by the signal processing circuit 3 by measuring the value of the current or the voltage flowing at that time through the electrode pads 106 formed at the ends of the interconnection layers 17a and 17b and through the signal line 4. Consequently, it is possible from this current or voltage value to check the quantity of the infrared radiation emitted from the object whose temperature is to be measured, i.e., the temperature of the object.

Figure 4:
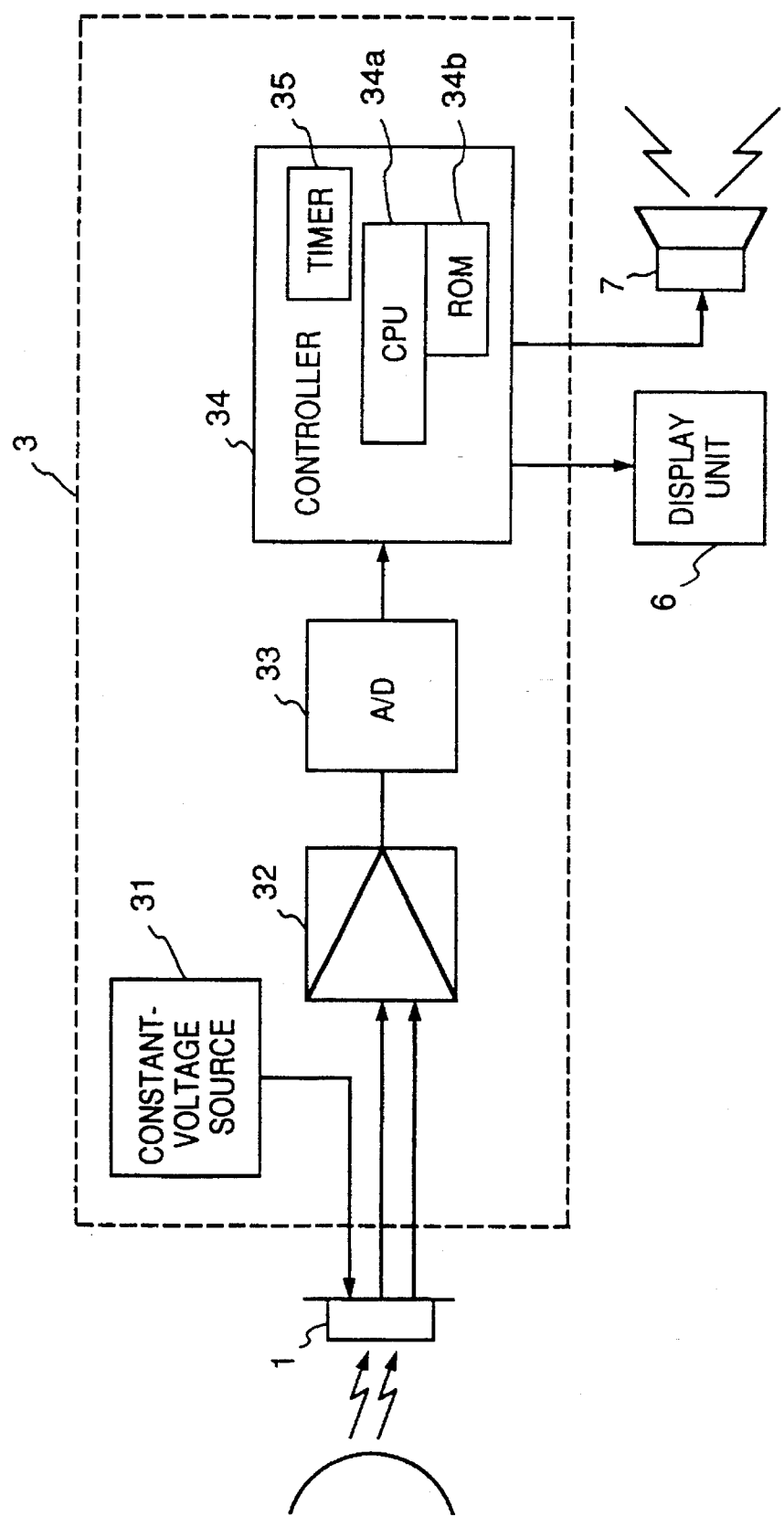
FIG. 4 is a block diagram showing the circuit configuration of the clinical thermometer of the first embodiment.
Figure 5:
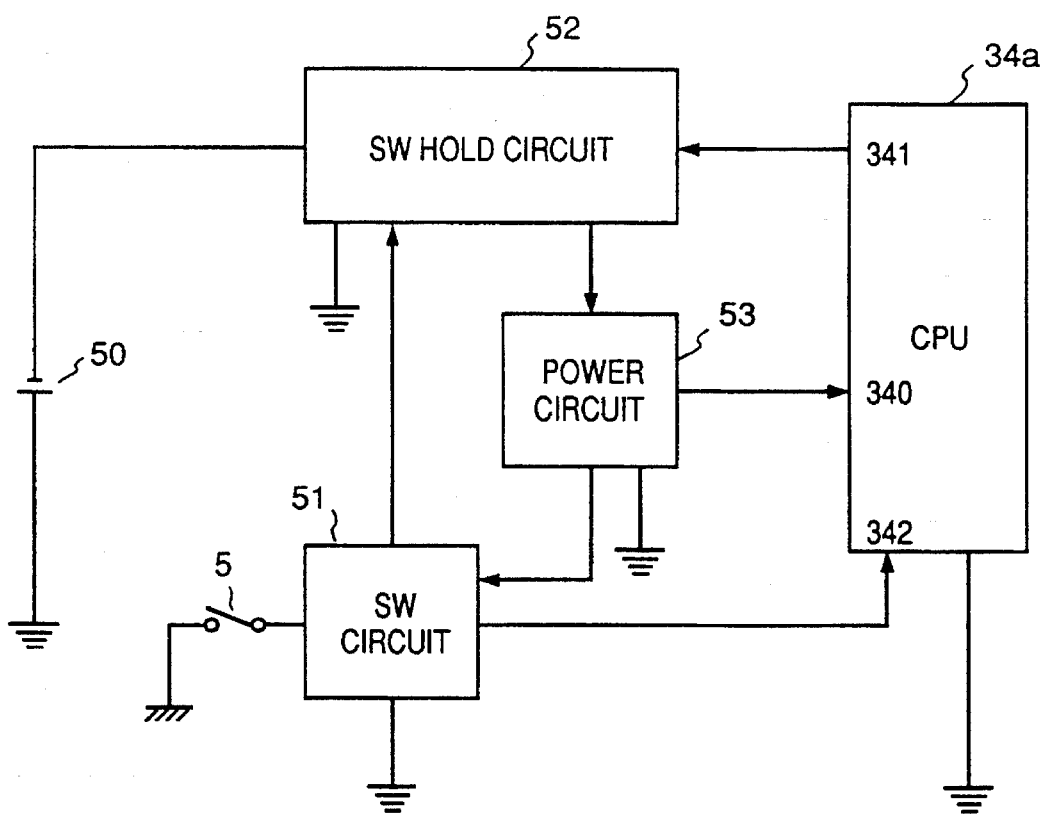
FIG. 5 is a block diagram showing the configuration of a switch circuit of the clinical thermometer of the first embodiment.

FIG. 4 is a block diagram showing the configuration of the signal processing circuit 3 of this embodiment. FIG. 5 is a block diagram showing peripheral circuits of a switch 5.

Referring to FIG. 4, reference numeral 31 denotes a reference constant-voltage source for applying a reference voltage to the infrared sensor 1; 32, an amplifier for amplifying a signal from the sensor 1; 33, an A/D converter for converting an analog signal from the amplifier 32 into a digital signal; and 34, a controller. The controller 34 converts the digital signal from the A/D converter 33 into an objective temperature by performing arithmetic operations for that signal, and performs processing of, e.g., holding the peak value of the objective temperature in accordance with the algorithm to be explained below. The controller 34 also causes the liquid crystal display (LCD) 6 to display the objective temperature as the measurement result, and controls the buzz of the buzzer 7. The controller 34 includes a CPU 34a such as a microprocessor, a ROM 34b which stores control programs (e.g., those shown in the flow charts of FIGS. 6 to 9) of the CPU 34a and other various data, and a timer 35 used in several different time measurements (to be described later).

Referring to FIG. 5, reference numeral 50 denotes a battery; 51, a mechanical switch circuit (SW circuit) consisting of mechanical switch contacts; 52, a switch hold circuit (SW hold circuit) consisting of transistors and the like; and 53, a power circuit for outputting the voltage of the battery 50 as a regulated voltage for driving the signal processing circuit 3. The switch circuit 51, the switch hold circuit 52, and the power circuit 53 are electrically connected to the controller 34.

The control processing operations and the circuit operations of the clinical thermometer of this embodiment will be described below with reference to the flow charts shown in FIGS. 6 to 9.

Figure 6:
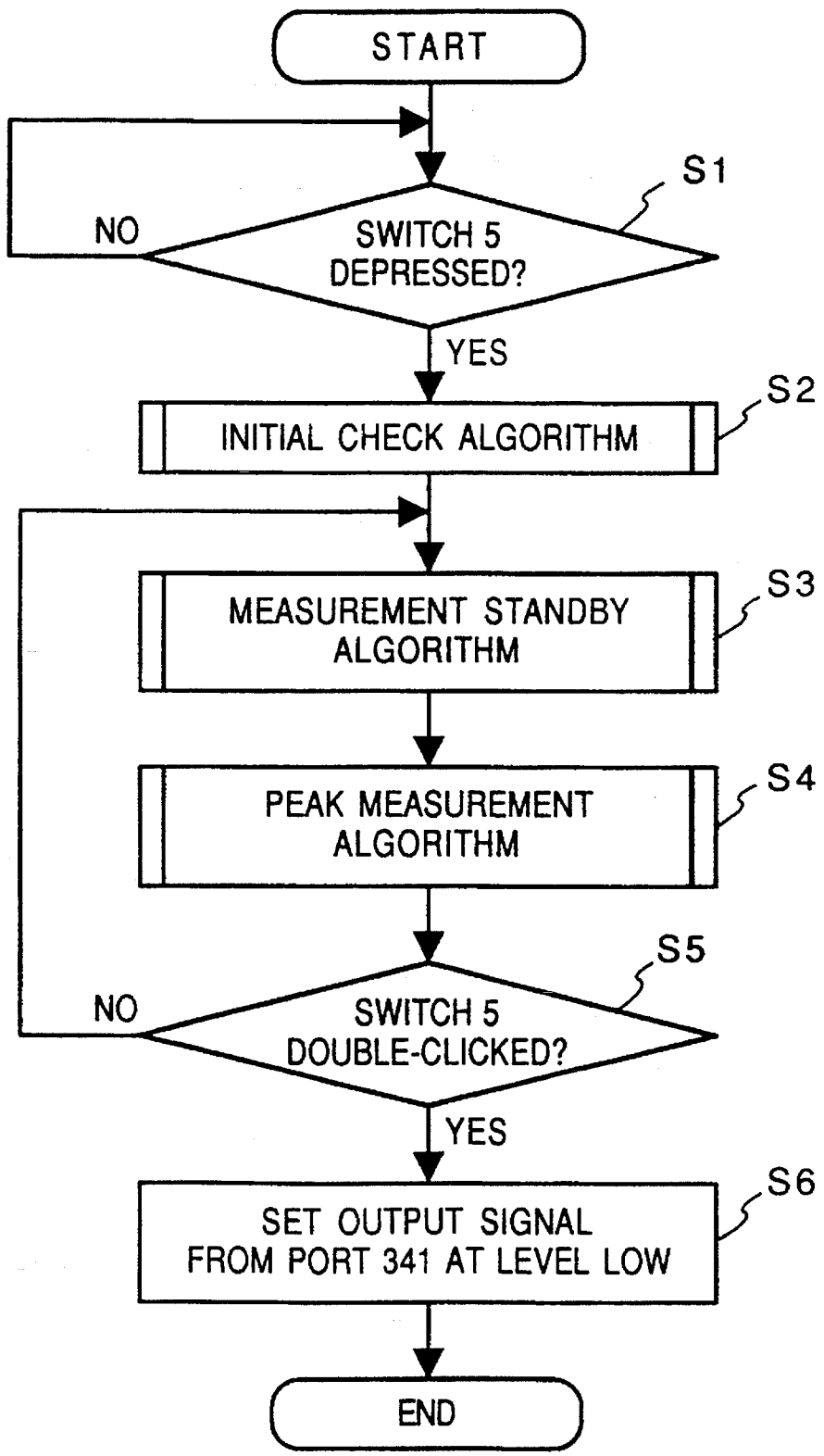
FIG. 6 is a flow chart showing main processing of the clinical thermometer of the first embodiment.

FIG. 6 shows the main flow chart of the control processing in this embodiment.

Referring to FIG. 6, when the switch 5 is depressed, power is supplied to the individual circuits including the controller 34, and the flow advances to step S2 to perform an initial check. An operation performed when the switch 5 is depressed to connect the power supply will be described with reference to the block diagram shown in FIG. 5. That is, when the switch 5 is depressed to connect the power supply, the switch hold circuit 52 is operated by the switch circuit 51, and power is supplied from the battery 50 to the power circuit 53. Consequently, the CPU 34a of the controller 34 is initialized to start operating, and an output signal from a switch selection port 341 of the CPU 34a goes to level HIGH. This makes it possible to operate the switch hold circuit 52 regardless of the state of the switch 5, permitting continuous power supply from the battery 50 to the power circuit 53.

Thereafter, the state of the switch 5 is monitored by a switch contact monitor port 342 of the CPU 34a. The switch 5 also has a function of designating the start of measurement and a function as a main switch for disconnecting the power supply. To disconnect the power supply, the output from the switch selection port 341 of the CPU 34a is changed to level LOW by, e.g., a power-OFF operation of the main switch, double-click of the switch 5, or an auto power-OFF function (by which the power supply is disconnected automatically if the system is not used over a predetermined time period). As a result, the switch hold circuit 52 stops operating, thereby disconnecting the power supply.

In FIG. 6, after the switch 5 is depressed in step S1, power is supplied to the CPU 34a, and initial check processing (step S2), measurement standby processing (step S3), and peak measurement processing (step S4) are executed. The flow returns to the measurement standby processing in step S2 unless the switch 5 is clicked twice (to be referred to as double-click hereinafter) in step S5. If the switch 5 is double-clicked in step S5, the flow advances to step S6 to change the output signal from the port 341 to level LOW, thereby disconnecting the power supply of the system.

The individual control processing operations shown in FIG. 6 will be described in more detail below.

Figure 7:
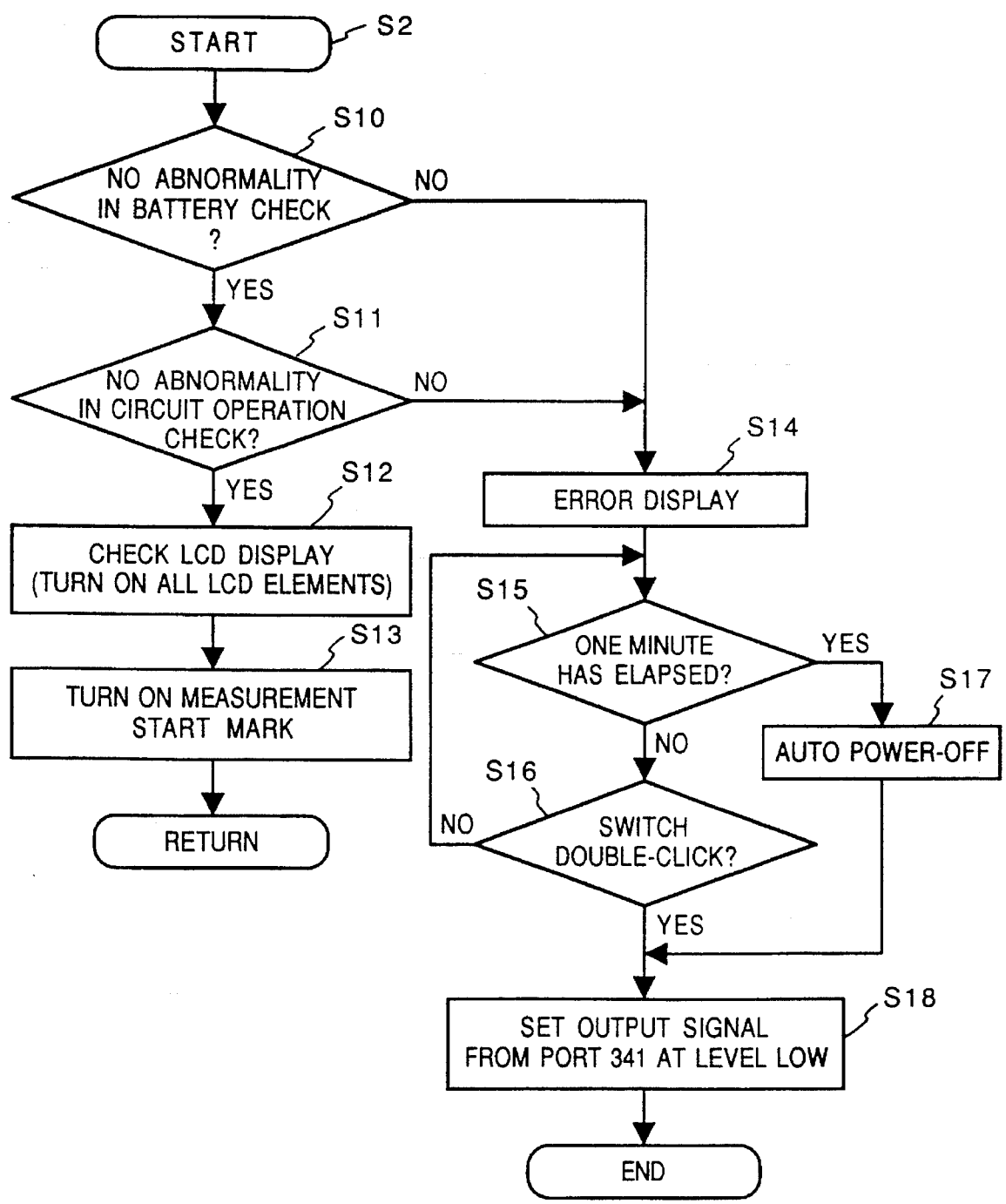
FIG. 7 is a flow chart showing initial check processing of the flow chart shown in FIG. 6.

FIG. 7 is a flow chart showing the initial check processing (step S2) of FIG. 6.

Referring to FIG. 7, after the power supply is connected, the battery 50 is checked in step S10. If no abnormality is found in step S10, the flow advances to step S11 to check circuit operations. If no abnormality is found in both steps S10 and S11, the flow advances to step S12 to turn on all display elements of the display (LCD) 6, checking the display function. The flow then advances to step S13 to display a measurement start mark indicating that measurement is possible. Thereafter, the flow returns to the main flow chart.

If an abnormality is found in either the battery check in step S10 or the circuit operation check in step S11, the flow advances to step S14 to perform error display on the display 6. The flow then advances to step S15. When a predetermined time, e.g., one minute has elapsed, the flow advances to step S17 to set an auto power-OFF mode for automatically disconnecting the power supply. The flow then advances to step S18 to set the signal from the port 341 at level LOW, thereby disconnecting the power supply. Alternatively, after the error display is performed in step S14 and before, e.g., the timer 35 detects in step S15 that one minute has elapsed, the CPU 34a checks in step S16 whether the switch 5 is double-clicked. If the switch 5 is double-clicked in step S16, the flow advances to step S18 to disconnect the power supply.

Figure 8:
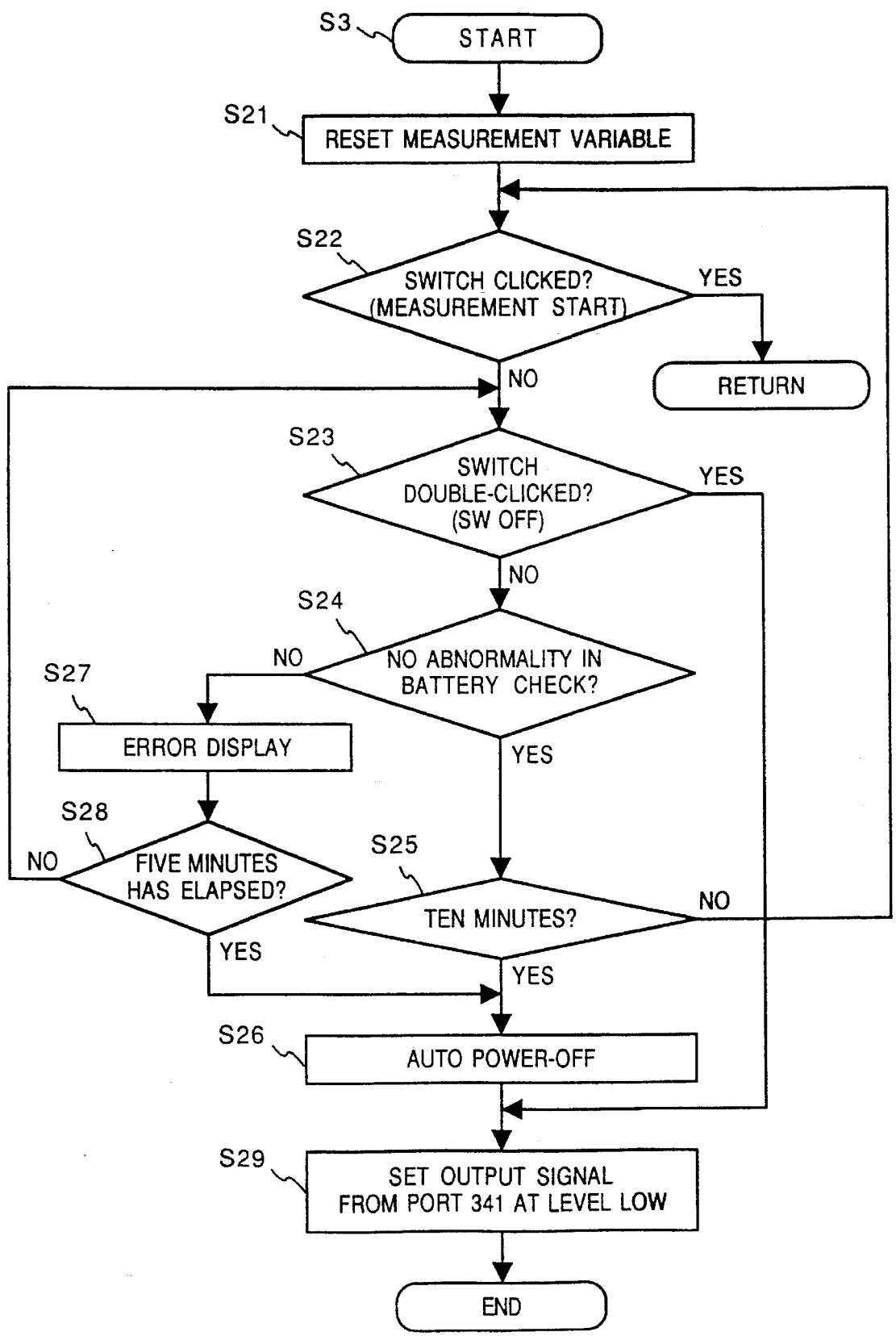
FIG. 8 is a flow chart showing measurement standby processing of the flow chart shown in FIG. 6.

FIG. 8 is a flow chart showing the measurement standby processing in step S3 of FIG. 6.

Referring to FIG. 8, a measurement variable is reset in step S21, and the CPU 34a then monitors in step S22 whether the switch 5 is clicked once (to be referred to as single-click hereinafter) to designate the start of measurement. If the switch 5 is not single-clicked in step S22, the flow advances to step S23, and the CPU 34a monitors whether the switch 5 is double-clicked (which means power-OFF designation). If the switch 5 is double-clicked in step S23, the flow advances to step S27 to disconnect the power supply of the system in the same manner as in step S6 or S18 mentioned earlier. If the switch 5 is not double-clicked in step S23, the flow advances to step S24 to execute battery check. If no abnormality is found in step S24, the flow advances to step S25, and the CPU 34a checks whether a predetermined time, e.g., the time measured by the timer 35 since the switch 5 is lately operated is within 10 minutes. If YES in step S25, the flow returns to step S22 to monitor the single-click of the switch 5.

If the time elapsed from the last operation of the switch 5 exceeds, e.g., 10 minutes in step S25, the flow advances to steps S26 and S27, thereby automatically disconnecting the power supply. In the measurement standby loop of the single-click monitoring in step S22→the double-click monitoring in step S23→the battery check in step S24→the determination in step S25 whether the timer has measured 10 minutes→the single-click monitoring in step S22, if an error is found by the battery check in step S24, the flow advances to step S27 to perform error display. The flow then advances to step S28. If a predetermined time, e.g., five minutes, has elapsed in step S28, the flow advances to step S26 to automatically disconnect the power supply. If the time elapsed after the error display is performed in step S27 is within five minutes in step S28, the flow returns to step S23 to again execute the double-click monitoring. Therefore, the double-click manipulation for the switch 5 also can disconnect the power supply. If the single-click manipulation for the switch 5 is detected in step S22 in this measurement standby loop, the flow returns to the main flow chart.

Figure 9:
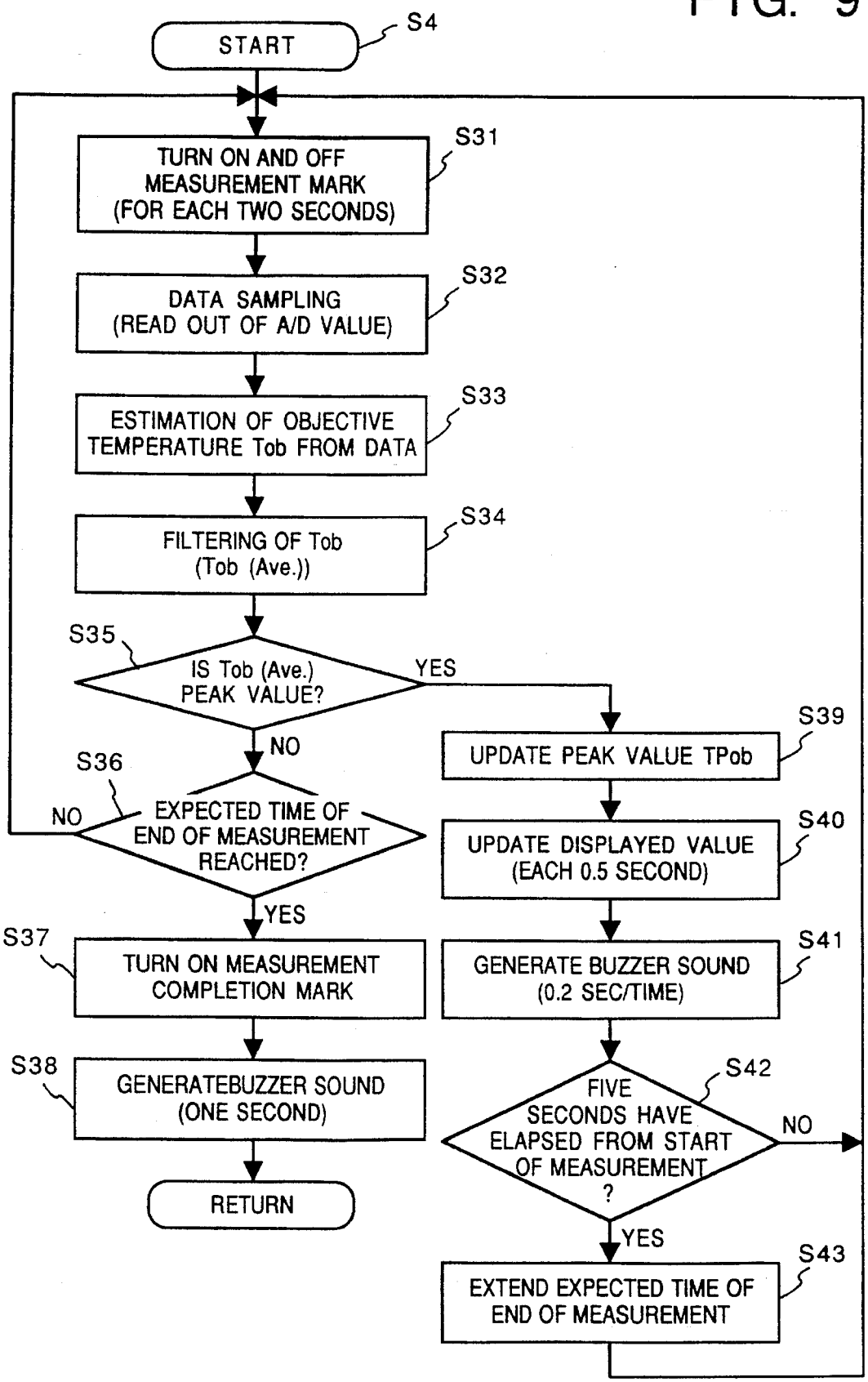
FIG. 9 is a flow chart showing peak measurement processing of the flow chart shown in FIG. 6.

FIG. 9 is a flow chart showing the peak measurement processing in step S4 of FIG. 6.

Referring to FIG. 9, in step S31, data is output from the sensor 1 while the measurement start mark is turned on and off on the display 7 with a predetermined time interval of, e.g., two seconds. In step S32, a digital value obtained by A/D-converting the output data by the A/D converter 33 is sampled and read out. In step S33, a temperature $T_{ob}$ of an object to be measured is estimated from the sampled data. The temperature of an object is estimated from a temperature table (RAM 34b) obtained beforehand by calibration. In step S34, the estimated temperature of an object to be measured is smoothed into $T_{ob}$ (Ave.) as time series data through a digital filter.

The flow then advances to step S35 to check which one of the $T_{ob}$ (Ave.) and a peak value $TP_{ob}$ (Ave.) is larger. If the $T_{ob}$ (Ave.) is larger, the flow advances to step S39 to update the $TP_{ob}$ (Ave.) as a peak value. Thereafter, the flow advances to step S40 to update temperature display on the display (LCD) 6 for each predetermined time period, e.g., 0.5 second. The flow then advances to step S41 to make the buzzer 7 generate sound for a certain predetermined time period, e.g., 0.2 second. If the time elapsed from the start of measurement is within a given predetermined time, e.g., five seconds in step S42, the flow returns to the measurement start mark ON/OFF display processing in step S31, continuously executing sampling for the next data. If, however, five seconds, for example, have elapsed from the start of measurement in step S42, an expected time of the end of measurement is extended. Thereafter, the flow returns to the measurement start mark ON/OFF display in step S31, to thereby sample the next data. The extension of the measurement time in step S43 is performed by adding a given predetermined time period, e.g., three seconds to the measurement time elapsed by that time. This extended time can also be changed by some other measurement conditions, e.g., the number of times of the extension of the measurement time in step S43. The number of times of the extension of the measurement time in step S43 is limited to a predetermined number of times, e.g., 10 times for each thermometry. Further, the measurement time is extended in at least one of following cases where the peak value $TP_{ob}$ (Ave.) is less than a predetermined temperature, e.g., 37° C. where a change of the $T_{ob}$'s (Ave.) is larger than a predetermined value, e.g., 0.1° C./sec, and where the difference of the previous $T_{ob}$ (Ave.) and the current $T_{ob}$ (Ave.) is larger than a predetermined value, e.g., 0.3° C.

If, on the other hand, the temperature $T_{ob}$ (Ave.) of an object to be measured is found to be lower when the $T_{ob}$ (Ave.) is compared with the peak value $TP_{ob}$ in step S35, the flow advances to step S36 to check whether the expected time of the end of measurement is reached. If NO in step S36, the flow returns to the measurement start mark ON/OFF processing in step S31, thereby keeping sampling the next data.

If the expected time of the end of measurement is reached in step S36, the flow advances to step S37 to display a measurement completion mark on the display 6. Thereafter, the flow advances to step S38 to make the buzzer 7 generate sound for a predetermined time period, e.g., one second, and the flow then returns to the main flow chart. Note that the measurement of the time in each of the above-mentioned steps is executed by using the timer 35.

If the power-OFF (double-click) is not designated at the end of one thermometry in the above processing, the flow again advances to the measurement standby processing. In this embodiment, as described above, the probe 2 incorporating the sensor 1 having a limited field of view is used in combination with the above measurement processing. Consequently, the highest temperature near an eardrum can be readily detected by properly changing the angle of insertion of the probe 2 into an external ear by moving the probe 2.

[2ND EMBODIMENT]

Figure 10:
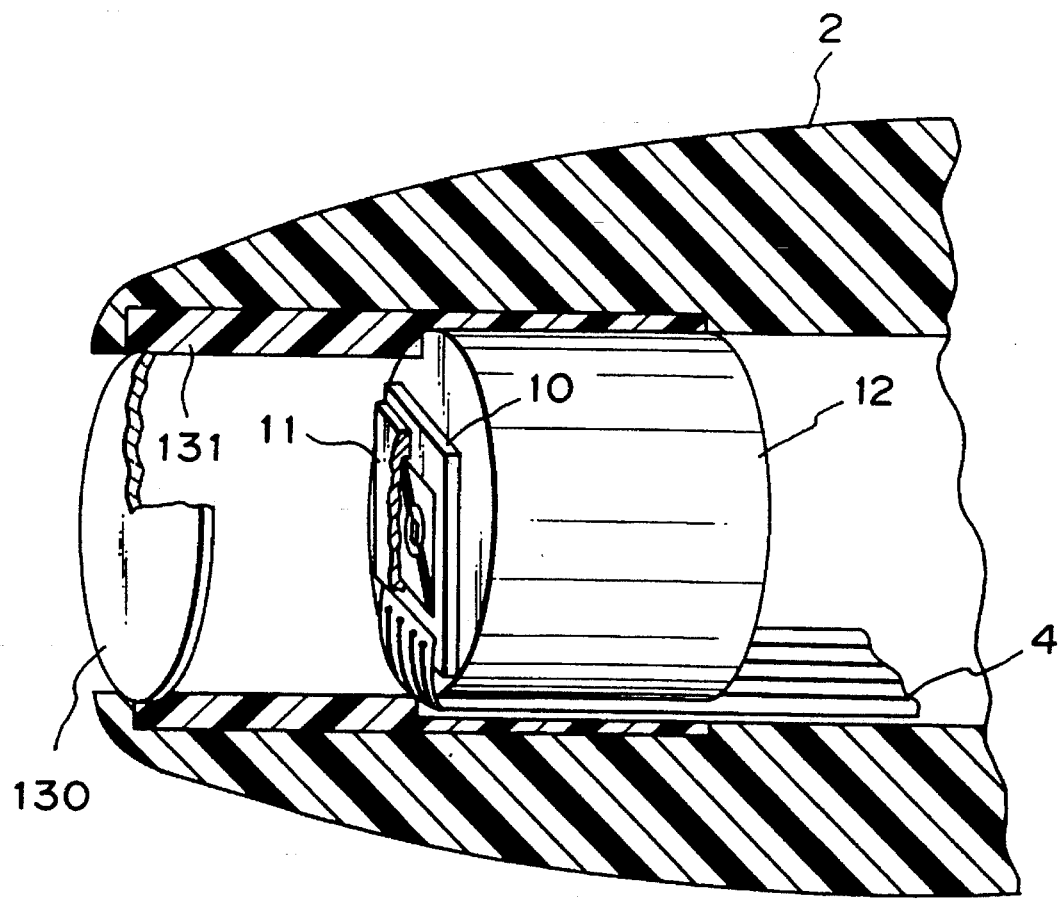
FIG. 10 is a partial sectional schematic view showing the tip of a probe of a clinical thermometer according to the second embodiment of the present invention.

FIG. 10 is a partial sectional view showing the structure of the tip of a probe 2 according to the second embodiment of the present invention. The same reference numerals as in the drawings explained earlier denote the same parts in FIG. 10, and a detailed description thereof will be omitted.

Referring to FIG. 10, reference numeral 130 denotes a optical lens; and 131, a substantially cylindrical support member for supporting the lens 130. As the material of the lens 130, it is possible to use a substance, such as polyethylene, having a high infrared transmittance and a high processability. The lens 130 is so formed as to minimize its thickness to, e.g., about 0.5 mm. For this purpose, the lens 130 is formed as a Fresnel lens by pressing or injection-molding a polyethylene sheet. With this arrangement, incident light of infrared radiation from a heat source onto a sensor chip 10 can be considered as substantially parallel light. This makes a substantially spot field of view of a sensor 1 possible.

[3RD EMBODIMENT]

Figure 11:
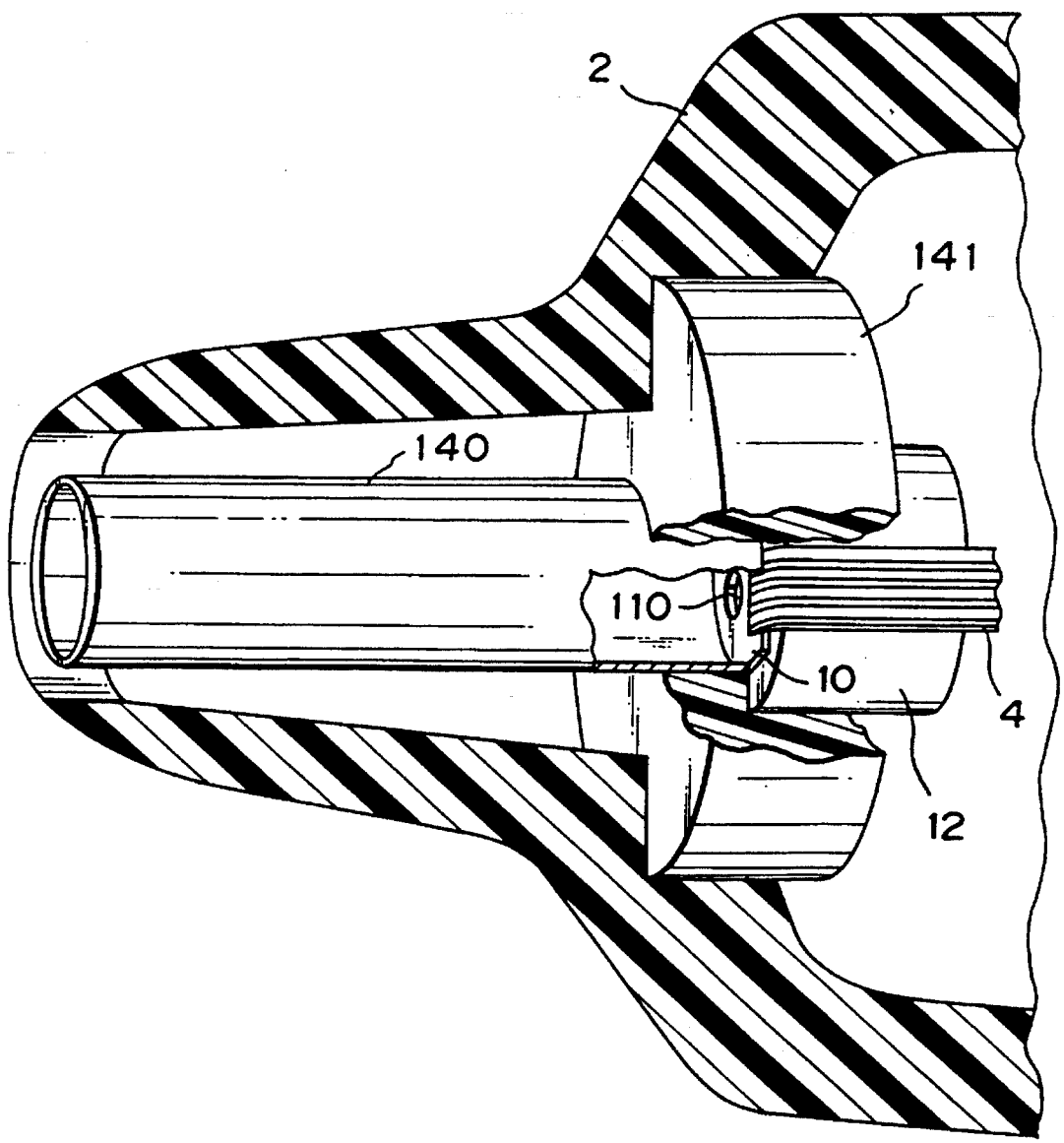
FIG. 11 is a partial sectional schematic view showing the tip of a probe of a clinical thermometer according to the third embodiment of the present invention.

FIG. 11 is a partial sectional view showing the structure of the tip of a probe according to the third embodiment of the present invention. The same reference numerals as in the drawings explained earlier denote the same parts in FIG. 11, and a detailed description thereof will be omitted.

Referring to FIG. 11, reference numeral 140 denotes a light guide; and 141, a holder for fixing the light guide 140 and a sensor chip 10. The inner surface of the light guide 140 is mirror-finished and plated with a substance, such as Au, having a high infrared reflectance. Therefore, the light guide 140 can guide infrared radiation from a heat source to a sensor chip 10 arranged behind the guide with little loss. It is desirable even in this arrangement that an aperture 110 for narrowing the field of view of the sensor chip 10 be provided. With this arrangement, it is possible to decrease disturbance on the sensor chip 10 caused by transfer of heat from an external ear, so stable measurements can be performed.

[4TH EMBODIMENT]

Figure 12:
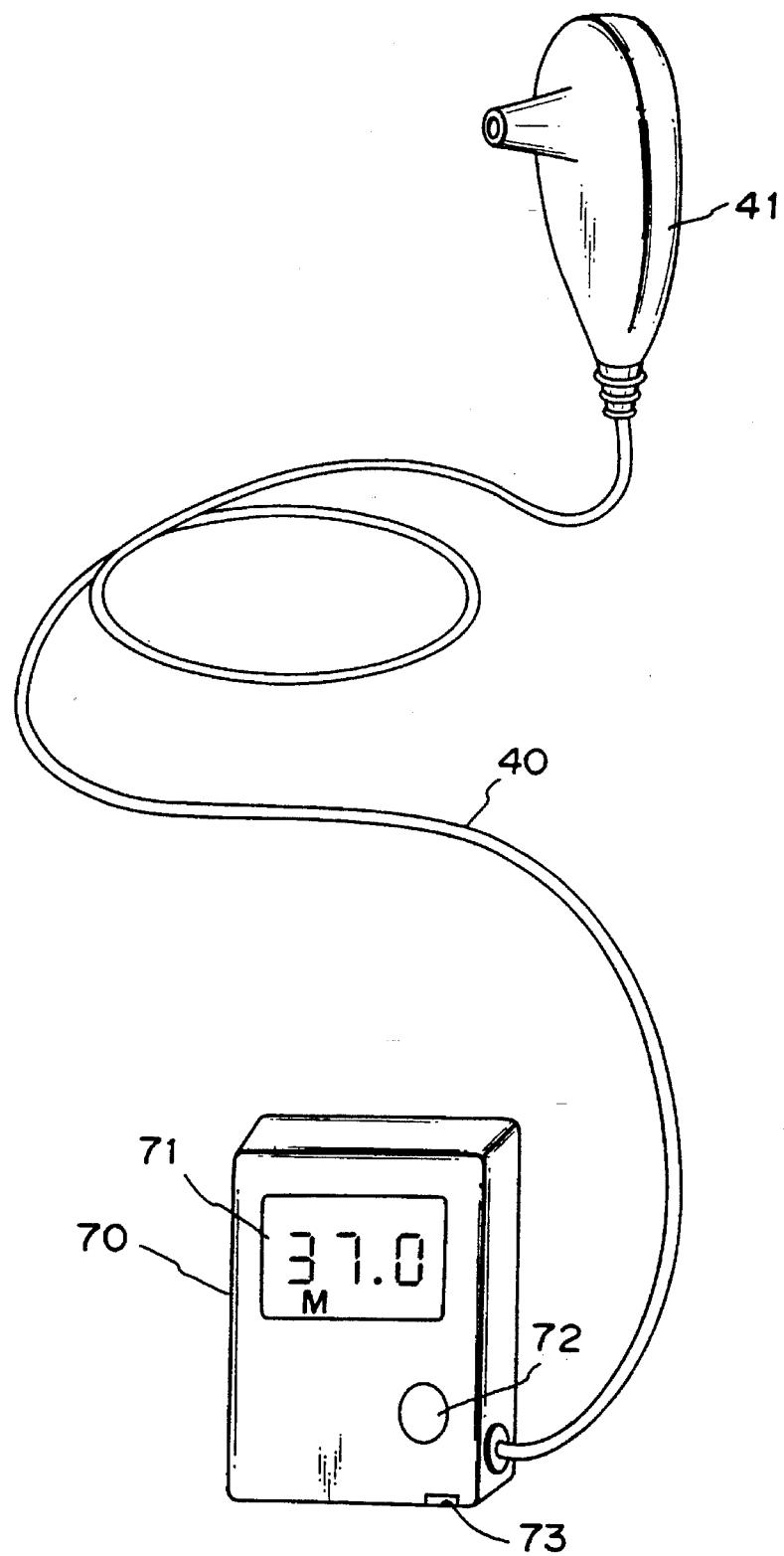
FIG. 12 is a schematic view showing an overall separate clinical thermometer according to the fourth embodiment of the present invention.
Figure 13:
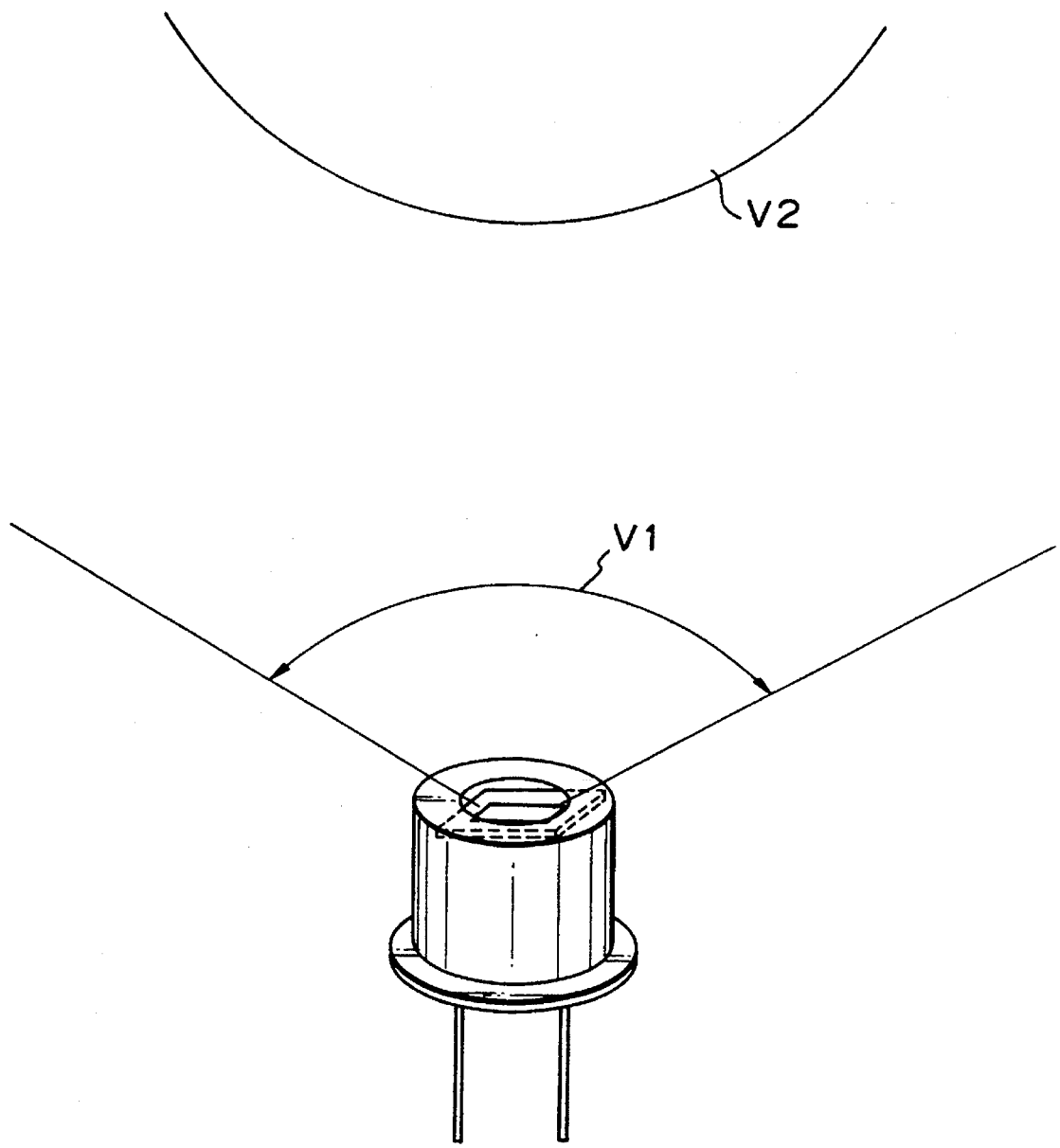
FIG. 13 is a view for explaining the field of view of an infrared sensor of a conventional clinical thermometer.

FIG. 12 is a schematic view showing a separate clinical thermometer according to the fourth embodiment of the present invention, in which a probe and a temperature display unit are separated.

Referring to FIG. 12, reference numeral 41 denotes a probe; 70, a temperature display main body case; 71, a display unit such as a liquid crystal display (LCD); 72, a switch corresponding to the switch 5 mentioned earlier; and 40, a cable for electrically or optically connecting the probe 41 and the temperature display main body case 70. The cable 40 can be accommodated in the main body case 70 when not in use. When in use, the cable 40 can be extended a certain length, e.g., about 30 cm by pulling the probe 41. The cable 40 can be automatically housed in the main body case 70 by depressing a cable wind key 73 when the clinical thermometer is not to be used. Therefore, a user can monitor a temperature value displayed on the LCD 71 during thermometry at the same time he or she hears a buzzer sound indicating the update of a peak value. Consequently, the user can readily point the field of view of the sensor in a direction of a portion at a high temperature in an external ear.

In this arrangement, since the measurement processing is replaced with the one without the peak hold function as mentioned earlier, only values actually measured are displayed on the LCD 71. This makes it possible to know the temperature distribution on the surface of a body and to check the peripheral circulation. In this actual measurement processing, no expected time of the end of measurement is set, so the measurement can be ended by, e.g., clicking the switch 72. In addition, mode switching from a peak measurement algorithm to an actual measurement algorithm or vice versa can be performed by a certain special manipulation, e.g., successively clicking the switch 72 three times (triple-click), which is not used in regular operations.

As described above, the noncontacting clinical thermometer of this embodiment includes the infrared sensor having a limited field of view, as a temperature sensor, and the optical system associated with the sensor. When measurement is started, this clinical thermometer informs a user of the peak value of measurement values by, e.g., generating sound each time the peak value is found, and changes the measurement end conditions to perform processing, such as extension of the measurement time. Consequently, the clinical thermometer of this embodiment can measure an accurate eardrum temperature.

In addition, by changing the measurement algorithm to the actual measurement mode to thereby select the body surface as a site to be measured, a user can easily check the circulation of peripheral blood vessels.

Other many widely different embodiments of the present invention can be made without departing from the spirit and scope thereof, it is to be understood that the invention is not limited to the specific embodiments thereof except that as defined in the appended claims.

What is claimed is:

1. A clinical thermometer for measuring a temperature of a living body in a noncontacting manner by receiving infrared radiation from an object to be measured, the thermometer comprising:

narrowing means for narrowing an angle of a field of view of an infrared sensor for sensing infrared radiation;

converting means for converting an electrical signal from the infrared sensor into a temperature value of the object to be measured;

detecting means for detecting a maximum value of the temperature values converted by said convening means;

timer means for measuring a predetermined time period;

temperature determining means for determining the temperature of the object to be measured, based on the maximum value detected by said detecting means when said timer means measures lapse of the predetermined time period from the start of the measurement;

control means for extending the predetermined time period to an extended predetermined time period if said timer means measures a time period longer than the predetermined time period when said detecting means detects the maximum value, and for causing said temperature determining means to determine the temperature of the object to be measured when said timer means measures lapse of the extended predetermined time period.

2. The clinical thermometer according to claim 1, further comprising sound generating means for generating sound when the maximum value detected by said detecting means is updated.

3. The clinical thermometer according to claim 1, wherein said narrowing means has a long, substantially cylindrical member for guiding the infrared radiation to said infrared sensor.

4. The clinical thermometer according to claim 1, wherein said narrowing means includes a lens having a high infrared transmittance.

5. The clinical thermometer according to claim 1, further comprising display means for displaying information indicating the temperature of the object to be measured.

6. The clinical thermometer according to claim 1, wherein said converting means includes A/D-converting means for converting the electrical signal from said infrared sensor into a digital signal, and means for processing the digital signal to obtain a digital value and for estimating the temperature value of the object to be measured from said digital value.

7. The clinical thermometer according to claim 6, wherein said control means extends the predetermined time period in accordance with the number of the digital value obtained before said detecting means detects the maximum value.

8. The clinical thermometer according to claim 6, wherein said means for estimating a temperature value of the object to be measured estimates the temperature value by referencing a table based on the digital value, and said converting means further includes smoothing means for smoothing the digital value and the temperature value estimated by said temperature estimating means.

9. The clinical thermometer according to claim 6, wherein said means for estimating a temperature value of the object to be measured estimates the temperature value by referencing a table based on the digital value, and said converting means further includes smoothing means for smoothing at least one of the digital value and the temperature value estimated by said temperature estimating means.

10. The clinical thermometer according to claim 1, wherein the object to be measured is an eardrum.

11. A clinical thermometer for measuring a temperature of a living body in a noncontacting manner by receiving infrared radiation from an object to be measured, the thermometer comprising:

a battery;

an infrared sensor;

narrowing means for narrowing an angle of a field of view of said infrared sensor;

converting means for converting an electrical signal from said infrared sensor into a temperature value of the object to be measured;

detecting means for detecting a maximum value of the temperature values converted by said converting means;

time measuring means for measuring a time period elapsed from the start of the measurement;

temperature determining means for determining that the maximum value of the temperature values, which is detected when said time measuring means measures that a predetermined time period has elapsed, is the temperature of the object to be measured;

display means for displaying a value of the temperature determined by said temperature determining means;

control means for extending the predetermined time period to an extended predetermined time period in accordance with at least one of the time period elapsed when said detecting means detects the maximum value is longer than the predetermined time period; the temperature values measured in the predetermined time period being less than a predetermined temperature value; and a difference between a current maximum value detected by said detecting means and a previous maximum value being greater than a predetermined value, said control means causing said temperature determining means to determine the temperature of the object to be measured when said time measuring means measures lapse of the extended predetermined time period from the start of the measurement.

12. The clinical thermometer according to claim 11, including a buzzer for generating sound to identify completion of temperature measurement.

13. The clinical thermometer according to claim 11, further comprising sound generating means for generating sound when the maximum value detected by said detecting means is updated.

14. The clinical thermometer according to claim 11, wherein said narrowing means has a long, substantially cylindrical member for guiding the infrared radiation to said infrared sensor.

15. The clinical thermometer according to claim 11, wherein said narrowing means has a lens for focusing the infrared radiation.

16. The clinical thermometer according to claim 11, wherein a probe for accommodating said infrared sensor is formed separately from a main body having said display means, said probe and said main body being connected through a cable.

17. The clinical thermometer according to claim 16, wherein said main body has a switch for designating the start of the body temperature measurement.

* * * * *

UNITED STATES PATENT AND TRADEMARK OFFICE
CERTIFICATE OF CORRECTION

PATENT NO. : 5,522,662
DATED : June 4, 1996
INVENTOR(S) : Masahiro SHIOKAWA

It is certified that error appears in the above-indentified patent and that said Letters Patent is hereby corrected as shown below:

In Column 10, line 37, delete "convening" and insert -- converting --.

Signed and Sealed this

Tenth Day of September, 1996

Attest:

BRUCE LEHMAN

Attesting Officer     Commissioner of Patents and Trademarks